3,728,141
ALKALINE-CURING CORRUGATING ADHESIVE
Dilip K. Ray-Chaudhuri, 484 Rolling Hills Road, Somerville, N.J. 08876; Jules E. Schoenberg, 2079 Lyde Place, Scotch Plains, N.J. 07076; and Keith E. Sickafoose, R.D. 1, Box 568, Princeton, N.J. 08540
No Drawing. Continuation-in-part of abandoned application Ser. No. 105,607, Jan. 11, 1971. This application July 12, 1972, Ser. No. 271,319
Int. Cl. C08b 25/02
U.S. Cl. 106—213                16 Claims

ABSTRACT OF THE DISCLOSURE

Starch-based alkaline curing corrugating adhesives containing a novel crosslinking additive for use in the manufacturing of corrugated paperboard are described: said adhesives are characterized by their excellent stability with respect to viscosity, prolonged pot life, and their ability to form water-resistant bonds.

---

This application is a continuation-in-part of our co-pending application Ser. No. 105,607 filed Jan. 11, 1971, now abandoned.

This invention relates to starch based alkaline curing adhesive compositions specifically intended for use in the manufacture of corrugated paperboard.

In the production of corrugated board, the procedure usually employed involves a continuous process wherein a strip of paperboard is first corrugated by means of heated fluted rolls, an adhesive is applied to the protruding tips on one side of the corrugated strip, a flat strip of another paperboard is then brought into contact with these tips, and, by the application of heat and pressure, a bond is formed. This latter step is then repeated on the other side of the corrugated strip so as to yield a hard sheet of paperboard comprising an inner corrugated layer sandwiched between two flat outer layers.

The adhesive composition most widely used in the above process comprises raw, ungelatinized starch suspended in an aqueous dispersion of cooked starch. The cooked starch dispersion, being rather viscous, serves as a carrier to keep the ungelatinized starch in suspension. At the point in the corrugating process where the flutes of the corrugated paperboard are to be adhered to the flat paperboard, sufficient heat is applied to gelatinize the raw, ungelatinized starch component of the adhesive, resulting in a sudden rise in viscosity and formation of the adhesive bond.

Since it is often desired or necessary that the corrugating adhesive yield waterproof or water-resistant bonds, several procedures have been devised to produce potentially waterproof adhesive compositions for use in the manufacture of corrugated paperboard. In one such procedure, amylaceous material has been combined with urea-formaldehyde resins using aluminum sulfate as a catalyst to produce waterproof or water-resistant bonds. These compositions must be prepared at a pH of less than 5 in order to enable the resin to function as the waterproofing agent. This low pH, however, imparts poor flow properties to the adhesive composition, thus resulting in greatly reduced machine speeds, corrosion of the glue rolls, and prevention of the development of many desirable paste characteristics such as tackiness, viscosity, rate of setting, and other properties. In another method, amylaceous material is cooked, under alkaline conditions, with urea-formaldehyde resins which set or harden at a pH of above 7. Although the bonds of corrugated board prepared from these adhesives show some improvement in water resistance, on exposure to wet weather conditions, they nevertheless tend to delaminate and fail to pass Federal specifications for corrugated paperboard.

Other waterproofing corrugating adhesives, such as those employing resorcinol and formaldehyde with starch, similarly suffer from serious drawbacks. The cost of these adhesives is often prohibitive because of the large amounts of resorcinol that is required. In addition, these adhesives have a short pot life at the pH range most useful for maximum production speeds. Other shortcomings of this adhesive include the slow rate of bond formation which results from its incompatibility with borax which is often added to starch-based adhesives as a tackifying agent to improve machine speeds.

Still other waterproofing corrugating adhesives employ the reaction product of acetone with formaldehyde as the waterproofing agent. A particular shortcoming of these adhesives is their short pot life, as will be more fully described in the examples herein.

It is an object of this invention to provide adhesive compositions which are characterized by their excellent prolonged pot life, stable viscosity, as well as their ability, when combined with web material such as corrugated board, to gelatinize in situ to form a water resistant bond. A further object of this invention is to provide a highly efficient and economical corrugating process employing these novel adhesives therein. Other objects and advantages of this invention will be apparent from the discussion that follows hereinafter.

We have now found that the use of specified concentrations of the condensation product of diacetone acrylamide, i.e. N-(1,1-dimethyl-3-oxobutyl) acrylamide, and formaldehyde as the crosslinking agent in place of urea-formaldehyde resins and the like in otherwise conventional starch-based corrugating adhesives provides these adhesives with superior water resistant bonding properties, viscosity stability, and pot life. In addition, these adhesives possess excellent tack, flow, and machining properties, and are fully compatible with water proofing agents of the prior art. Moreover, the water resistance of the corrugated boards prepared by using these adhesives is attained within a short time after they have left the machine, thereby facilitating their further processing. In addition, the use of these adhesive compositions employing conventional corrugating equipment and processes makes possible high production speeds because of the higher alkalinity employed and compatibility with borax. The offensive or toxic odors that often arise from the use of resorcinol and formaldehyde with starch are avoided, and, in general, the overall efficiency and economy of the corrugating process is increased.

More particularly, the novel corrugating adhesives of our invention comprise (A) from about 10 to 40%, preferably 18 to 30%, based on the total weight of the adhesive, of starch, this including the gelatinized as well as the ungelatinized portions of the starch; (B) from about 0.3 to 4%, based on the total weight of the starch, of an alkali such, for example, as sodium hydroxide; (C) from about 0.3 to 10%, preferably 1 to 4% based on the total weight of the starch, of a diacetone acrylamide-formaldehyde condensate; and (D) from about 54 to 89% of water, based on the total weight of the adhesive. In order to further improve the tackifying properties of these adhesives, the practitioner may, if desired, introduce borax in a concentration of up to about 4%, based on the total weight of the starch.

In these compositions, a major portion of the starch is employed in its ungelatinized, raw form, suspended in a viscous carrier which is usually an aqueous dispersion of cooked, gelatinized starch having a total solids content in the order of about 3.5%, by weight. Upon application of heat during the corrugating process, the uncooked starch gelatinizes to produce the required viscosity increase and tack which, in turn, makes possible the adhesive bond. The viscous carrier essentially serves to deliver the uncooked starch to the interface where the in situ gelatinization and adhesion is to take place and also contributes to the strength of the adhesive bond.

When we use the term "starch" herein, we refer to native, raw starches as well as to modified starches such as oxidized, esterified, etherified, dextrinized and hydrolyzed starches which still retain their amylaceous characteristics. Suitable starches may be derived from any sources, including corn, wheat, potato, tapioca, waxy maize, waxy sorghum, rice, etc. High amylose starches derived from genetically modified sources may also be used herein.

It is to be noted that a number of water dispersible, high viscosity, polyhydroxy-polymeric materials can be used to replace, either partially or wholly, the starch which is utilized in the carrier portion of the adhesive. Specific examples of such water dispersible, polyhydroxy-polymeric materials suitable for use herein include cellulose derivatives such as sodium carboxymethyl cellulose, polyvinyl alcohols and hydrolyzed polyvinyl acetates. No borax should be used in preparing adhesives which include polyvinyl alcohol because of their relative incompatibility.

The preparation of the diacetone acrylamide-formaldehyde condensates used herein is carried out by means of the reaction of diacetone acrylamide with a variable amount (as later defined) of formaldehyde. In a typical procedure, diacetone acrylamide is diluted with water and mixed with paraformaldehyde (or other source of formaldehyde) while maintaining the pH of the reaction mixture at from 9.5 to 11.5 using an aqueous solution of any common base such as sodium or potassium hydroxide. Examples of other bases operable herein include alkaline earth hydroxides such as calcium hydroxide, alkaline earth oxides such as barium oxide, alkali metal carbonates such as sodium carbonate, and alkali metal silicates such as sodium silicate. While moderate heat may be applied to initiate and to hasten the rate of the reaction, the reaction is exothermic and temperatures above 50° C. are usually unnecessary. At the completion of the reaction, about 2 to 6 hours, the reaction mixture is usually neutralized using an acid such as hydrochloric or sulfuric acid. With respect to proportions of reactants, it has been found that the condensates most preferable for use in our novel corrugating adhesives are prepared, using from about 1.5 to 5 moles of formaldehyde per mole of diacetone acrylamide. Procedures including variations of the above described procedure for preparing such condensates are well known to those skilled in the art.

It can be understood that the specific procedure for the preparation of our novel corrugating adhesives is not critical since the adhesive may be prepared in any conventional manner that will provide in the final product a uniform mixture of a dispersion of a gelatinized starch (sometimes termed "the carrier"), ungelatinized starch which serves as the major adhesive component of the corrugating adhesive, alkali, and the diacetone acrylamide-formaldehyde condensate. The concentration of the components should be within the ranges set forth hereinabove. Borax, if not incompatible with the other ingredients, as well as other ingredients such as fillers, pigments, peptizing agents for starch such as urea, stabilizing salts, etc. may also be incorporated in our adhesives, if desired. It is to be noted, however, that an effective corrugating adhesive can be formulated without the addition of any of these optional ingredients.

In addition to the described crosslinking agents comprising the condensation product of diacetone acrylamide and formaldehyde, we have found that specified amounts of a condensate of acetone and formaldehyde can be used to replace a part of the diacetone acrylamide-formaldehyde condensate. Use of such combinations of crosslinking agents serves to lower the cost of the resultant adhesive with no significant decreases in water resistant bonding properties, viscosity stability or pot life. In making use of these combinations, the two condensates are prepared separately and then added to the adhesive, either separately or as a mixture. The acetone-formaldehyde condensates for use in our novel corrugating adhesives are prepared using from 2 to 6 moles of formaldehyde per mole of acetone. Generally up to about 65%, by weight (solids basis), of the diacetone acrylamide-formaldehyde condensate can be replaced by the acetone-formaldehyde without serious loss of viscosity stability. It will be appreciated by those skilled in the art, however, that a number of factors are involved in determining the maximum replacement permitted, including in particular, the total amount of condensate used and the type of starch employed in the adhesive. Thus, in some instances only about 55%, by weight, of the diacetone acrylamide-formaldehyde condensate may be replaced with the acetone-formaldehyde condensate. On the other hand, where viscosity stability of about 12 or more hours in not required, a maximum of about 90%, by weight, of the diacetone acrylamide-formaldehyde condensate may be replaced by the acetone-formaldehyde condensate.

A preferred method with respect to the introduction of the condensate combination is to prepare a single condensate by reacting formaldehyde with a mixture of diacetone acrylamide and acetone. In these condensates of formaldehyde with mixtures of diacetone acrylamide and acetone, no more than about 2.5 moles of acetone per mole diacetone acrylamide is used where the condensate is used with adhesives comprising high amylose starches. Where the condensate is used with adhesives comprising conventional starches, such as ordinary corn starch, condensates having about 3 moles of acetone per mole of diacetone acrylamide are permitted. The molar ratio of formaldehyde to total ketone (diacetone acrylamide plus acetone) in these condensates may range from about 2 to 6.

In more detail the preparation of our corrugating adhesives may be described as follows:

PREPARATION OF GELATINIZED STARCH OR CARRIER

A slurry of a small portion of the total starch, ordinarily about 3 to 6% of the total weight of the adhesive composition, is heated to a temperature ranging from 50 to 80° C. An aqueous solution of alkali is added thereto; alternatively, the alkali may be added in solid form as, for example, in flake or pelletized form. The alkali employed herein is preferably sodium hydroxide. Examples of other alkalies, i.e. bases, which may be employed in partial or full replacement of the sodium hydroxide, include borax, as well as alkali metal hydroxides such as potassium hydroxide, alkaline earth hydroxides such as calcium hydroxide, alkaline earth oxides such as barium oxide, alkali metal carbonates such as sodium carbonate, and alkali metal silicates such as sodium silicate. Heating and agitation is continued for a period of time ranging from 5 to 30 minutes, after which time heating is terminated and water is added to cool and dilute the dispersion.

PREPARATION OF THE FINAL ADHESIVE

The thus prepared gelatinized starch is slowly added to a slurry comprising the remaining starch (which is ungelatinized) and water (and borax, if used), and agitation is continued until the adhesive is smooth and uniform. The preparation of the adhesive is completed by adding the desired concentration of the selected diacetone acrylamide-formaldehyde condensate.

It can be appreciated that several variations may be readily utilized in the preparation of our corrugating adhesives as described above. Thus, it is also common in the art to incorporate the borax in the carrier dispersion, either prior to or after heating. Likewise, it is acceptable to add the diacetone acrylamide-formaldehyde condensate to the carrier or to the ungelatinized starch slurry prior to preparation of the final adhesive.

The following examples will further illustrate the embodiment of our invention; all parts given are by weight unless otherwise noted.

EXAMPLE I

This example illustrates a typical procedure for the preparation of the diacetone acrylamide-formaldehyde condensate used in our novel corrugating adhesives.

A reaction vessel equipped with a thermometer, condenser, pH electrodes and a means for stirring was charged with 338 parts of diacetone acrylamide, 360 parts of water and 158 parts of paraformaldehyde which was 95% polymerized formaldehyde by weight. The pH of the mixture was adjusted to 11.4 with the addition of 10 M sodium hydroxide and the mixture was heated to 40° C. An exothermic reaction took place which was evidenced with the disappearance of the paraformaldehyde. Additional sodium hydroxide was added to the reaction mixture from time to time so as to keep the pH from about 10.8 to 11.5 for a period of 4 hours. At the end of this period the mixture was cooled (the temperature had been maintained at 40° C. for the entire period) and neutralized with concentrated hydrochloric acid to a pH of 6.0 and the condensate was ready for use in the adhesive composition.

The amounts of reactants specified above illustrate a condensate having a molar ratio of 2.5 moles of formaldehyde to 1 mole of diacetone acrylamide. The solids content of the condensate was about 56% by weight.

EXAMPLE II

This example illustrates the preparation of a typical corrugating adhesive of this invention.

Preparation of gelatinized starch

To 100 grams of water was added 28 grams of corn starch and the slurry was heated to 60° C. with agitation. About 75 grams of water containing 5 grams of sodium hydroxide was then added to the slurry and heating was continued for a period of 15 minutes. At the end of this period heating was terminated and about 143 grams of water was added to cool and dilute the resultant dispersion.

Preparation of the final adhesive

The thus prepared gelatinized starch dispersion was thereafter added to a slurry comprising 197 grams of corn starch, 3.5 grams of borax ($Na_2B_4O_7 \cdot 5H_2O$) and 325 grams of water. The mixture was agitated for a period of 10 minutes after which time 6.3 grams dry weight (2.8% based on the weight of the total starch) of the diacetone acrylamide-formaldehyde condensate, prepared as described in Example I hereinabove was added thereto and stirring was continued until the adhesive was uniform in texture.

Fiberboard produced by using the described adhesive was water resistant and passed ASTM specification D1028–59.

EXAMPLE III

It is well recognized that cooked starch dispersions (and corn starch dispersions containing a crosslinking agent of the prior art in particular) will tend to thicken or gel upon standing, and this phenomenon is usually observed in all corrugating adhesives based on such starch dispersions. In contrast, the corrugating adhesives of this invention, by virtue of the added diacetone acrylamide-formaldehyde condensate, exhibit a relatively stable viscosity over a given period of time as compared to comparable prior art adhesives. The table below summarizes viscosity data obtained on testing several adhesives of this invention based on corn starch and prepared as described hereinabove in Example II and a comparable adhesive to which was added acetone-formaldehyde condensate in the same proportions. The adhesives were aged for periods of 4 hours and 24 hours at 40° C., without agitation. The viscosities of the adhesives were measured using a Brookfield Viscometer at 20 r.p.m. using the indicated spindle.

TABLE I

| Adhesive | Viscosity in cps. After 4 hrs. | Viscosity in cps. After 24 hrs. | Spindle number |
|---|---|---|---|
| 1. Adhesive containing 2.8% (solids basis) of a diacetone acrylamide-formaldehyde condensate (1:2.5) based on the weight of the starch | 400 | 650 | 3 |
| 2. Adhesive containing 2.8% (solids basis) of a diacetone acrylamide-formaldehyde condensate (1:3.0) based on the weight of the starch | 750 | 1,325 | 3 |
| 3. Adhesive containing 2.8% (solids basis) of a diacetone acrylamide-formaldehyde condensate (1:5.0) based on the weight of the starch | 425 | 450 | 3 |
| 4. "Control" adhesive containing 2.8% (solids basis) of an acetone-formaldehyde condensate based on the weight of the starch | 425 | 78,000 | 1 |

It is seen that the increase in the viscosity with the novel adhesives of this invention after standing for a twenty-four hour period is negligible as compared to the "control" adhesive shown for comparative purposes. This stability with respect to viscosity of our adhesives is particularly significant to the corrugated board manufacturer. Needless to say, extreme variations in viscosity are not in keeping with the uniformity and control desired in the commercial manufacture of corrugated board.

EXAMPLE IV

The improved pot life of the novel adhesives of this invention can be largely attributed to the lack of any significant crosslinking of the starch taking place prior to its application and heating in the corrugating process itself. Thus, it can be understood that where crosslinking of the starch does take place prematurely at room temperatures while waiting for use (as, for example, with many prior art adhesives used for this purpose) the ability of the adhesive to subsequently rapidly and efficiently form a film as is necessary in forming an adhesive bond is correspondingly diminished. It follows that premature crosslinking of the starch will likewise impair the desired tack and water resistant bonding properties of the thus affected adhesive. The practical consequence of premature crosslinking is that the corrugated board manufacturer is often forced to discard adhesive that has not been used within a certain time period.

The following procedure was used in determining and effectively demonstrating the improved pot life of the adhesive compositions of this invention. Three adhesive formulations were prepared, each identified as follows:

Adhesive A.—Prepared as described in Example II hereinabove and containing 2.8% (solids basis) of a diacetone acrylamide-formaldehyde condensate (1:2.1) based on the weight of the starch.

Adhesive B.—Identical to Adhesive A hereinabove except that it contained 3% (solids basis) of an acetone-formaldehyde condensate in place of the diacetone acrylamide-formaldehyde condensate herein used.

Adhesive C.—The control adhesive was identical to Adhesive A hereinabove except that it contained no diacetone acrylamide-formaldehyde condensate.

Samples of the three adhesives were tested after being aged for a period of 24 hours at 40° C. with respect to viscosity over a time-temperature relationship by means of a Brabender Visco-Amylo-Graph. Thus, at the start of the test each sample (diluted with an aqueous base), respectively, was warmed at 35° C. for a period of 5 minutes and thereafter heated in such a manner as to reach a temperature of 90° C. in a period of 25 to 30 minutes. Adhesive A and Adhesive C, i.e. the adhesive of this invention and the control adhesive each exhibited a sharp increase in viscosity which peaked after a period of 8 or 9 minutes at a temperature of about 50° C. and thereafter exhibited a gradual decrease in viscosity. The increase in viscosity corresponds to the swelling of the starch granules while the decrease in viscosity corresponds to the bursting of the granules, indicating that no crosslinking had taken place during the aging period. In contrast, Adhesive B, the adhesive containing the acetone-formaldehyde condensate exhibited only a minimal increase in viscosity over the entire 30-minute run and showed no peak viscosity at all. This behavior is characteristic of crosslinked starches. Adhesive B cannot be expected to provide good bonds which rely on in situ gelatinization and crosslinking, since it has already crosslinked during its 24-hour aging period and exhausted its potential for crosslinking.

EXAMPLE V

The water resistant properties of bonds formed with starch based corrugating adhesives are largely derived from the crosslinking of the starch which takes place at the bonding interface during the in situ gelatinization. Where premature crosslinking of the starch takes place during storage of the adhesive prior to its actual use, the starch will have little or no potential remaining to crosslink at the bonding site of the paperboard laminate. As demonstrated in the previous example, the superior pot life of the adhesives of this invention, as evaluated by means of a viscosity-time-temperature relationship indicated little, or no, crosslinking to take place during a 24 hour aging period. It is to be expected therefore that the adhesives of the present invention, even after aging, would be capable of forming bonds having a high degree of water resistance.

An adhesive composition of this invention based on corn starch and containing the diacetone acrylamide-formaldehyde condensate was prepared as described in Example II hereinabove. Two comparable adhesives were prepared in similar manner except that one contained an acetone-formaldehyde condensate in place of the diacetone acrylamide-formaldehyde condensate while the remaining adhesive contained neither the diacetone acrylamide-formaldehyde condensate nor the acetone-formaldehyde condensate.

All of the adhesives were aged for a period of 24 hours at a temperature of 40° C. and laminations were prepared utilizing 60 lb. ream wet strength paper and adhesive films of 1.5 and 3.0 mils thickness of each adhesive, respectively. The laminates were placed on a hot plate at a temperature of 350° F. applying nominal pressure 0.25 p.s.i. for a period of 20 seconds. The laminates were then placed in a conditioning atmosphere (72° F., 50% relative humidity) for 24 hours and thereafter, strips of these laminates were placed in water at 72° F. for a period of 24 hours.

At the end of this period the laminates were blotted on paper towels in order to remove the excess water and the peel strength of each bond was determined with an Instron Tensile Tester. Results observed with these tests are summarized in Table II, following.

TABLE II

| Adhesive | Peel force (lb./linear in.) | |
|---|---|---|
| | 1.5 mil film | 3.0 mil film |
| 1. Adhesive containing 2.8% (solids basis) of a diacetone acrylamide-formaldehyde condensate (1:2.1) based on the weight of the starch | 0.118 | 0.121 |
| 2. "Control" adhesive containing 2.8% (solids basis) of an acetone-formaldehyde condensate based on the weight of the starch | 0.066 | 0.071 |
| 3. "Control" adhesive containing neither acetone-formaldehyde condensate nor diacetone formald. hyde condensate | Both films delaminated in the water | |

The above data clearly demonstrate the superior water-resistant bonds which may be achieved utilizing the corrugating adhesive of our invention. Thus, Composition 1 containing diacetone acrylamide-formaldehyde condensate produced bonds which were substantially more water resistant than those produced utilizing either of the two controls, i.e. a composition containing a crosslinking additive of the prior art and a composition containing no crosslinking additive.

EXAMPLE VI

This example illustrates the use of a representative corrugating adhesive of this invention in a laboratory manufacturing process for producing corrugated paperboard.

Preparation of gelatinized starch

To 1192 ml. of water was added 424 grams of a high amylose corn starch (70% amylose, by weight), 60 grams of borax.

The slurry was heated to 130° F. while stirring and 36.6 grams of sodium hydroxide in 47.6 ml. of water was added thereto. Heating was continued so as to maintain the temperature of the resulting slurry at 135° F. for a period of 15 minutes and thereafter the resultant starch dispersion was cooled and diluted by the addition of 47.6 ml. of water.

Preparation of the final adhesive

An ungelatinized starch slurry was prepared by combining 3480 ml. of water (85° F.), 28 grams of borax and 1600 grams of corn starch. To this slurry was added with stirring 91.2 grams of an aqueous solution (65% solids, by weight) of a diacetone acrylamide:formaldehyde condensate (1:2.5). The previously prepared gelatinized starch was then added to the thus-prepared starch slurry over a period of 20 minutes completing the preparation of the corrugating adhesive.

Corrugated paperboard manufacture

Corrugated paperboard was prepared in an experimental single face corrugator. A grade of wet strength medium (30 pounds/1,000 square feet) was passed through a fluted corrugating roller at 350° F. and bonded, employing the freshly prepared described adhesive in a film thickness of about 14 mils to wet strength liner boards (62 pounds/1,000 square feet). With the freshly prepared adhesive, commercially acceptable wet strength paperboard was produced at speeds of up to about 200 feet/minute.

Use of the identical adhesive after aging at 105° F. for a period of 24 hours resulted in comparable production speeds. The use of prior art adhesives in this manner has ordinarily resulted in lower production speeds. After aging for periods of about 24 hours such adhesives are usually completely ineffective and unacceptable for use. Samples of the corrugated paperboard prepared with the adhesive of this invention exhibited excellent wet strength when evaluated according to the procedure described in the previous example.

EXAMPLE VII

This example shows the preparation of two adhesives typical of this invention wherein a portion of the diacetone acrylamide-formaldehyde condensate was replaced with an acetone-formaldehyde condensate.

Two condensates were separately prepared, a diacetone acrylamide-formaldehyde condensate using 2.5 moles of formaldehyde per mole of diacetone acrylamide and an acetone-formaldehyde condensate. The condensations were carried out essentially in the manner described in Example I.

Two adhesives were thereafter prepared in a manner and proportions similar to that described in Example II, each adhesive containing 3.5% (solids basis) of condensate based on the weight of the starch. Of the total condensate employed in each adhesive, one adhesive contained 58%, by weight, of the diacetone acrylamide condensate and 42%, by weight, of the acetone-formaldehyde condensate while the other adhesive contained 31%, by weight, of the diacetone acrylamide condensate and 69%, by weight, of the acetone-formaldehyde condensate.

When the viscosity of each of the adhesives was determined after 1 hour and 16 hours (general procedure as described in Example III), it was found that the viscosity of the first adhesive where 42%, by weight, of the diacetone acrylamide condensate was replaced with the acetone condensate remained essentially stable with no significant increase in viscosity after 16 hours. The 16 hour viscosity of the second adhesive increased sharply as compared to its 1 hour viscosity.

It can be concluded that the latter adhesive would be unacceptable where 16-hour viscosity stability was required. The adhesive containing approximately equal parts of the diacetone acrylamide and acetone condensates showed no significant loss of viscosity stability.

EXAMPLE VIII

This example shows the preparation of a condensate of formaldehyde with a mixture of diacetone acrylamide and acetone and its use in an adhesive.

A reaction vessel equipped with a thermometer, condenser, pH electrodes, and a means for stirring was charged with 84.6 parts of diacetone acrylamide, 29.0 parts of acetone, 94.8 parts of paraformaldehyde, which was 95%, by weight, polymerized formaldehyde, and 82.6 parts of water. The condensation was carried out essentially in the same manner as described in Example I. The amounts of reactants specified above illustrate a condensate equivalent to employing six moles of formaldehyde to one mole of diacetone acrylamide and one mole of acetone. The condensate was thereafter added in a concentration of 2.8% (solids basis) based on the weight of starch, to a starch-based corrugating adhesive similar to that described in Example VI.

In order to show the desirable properties obtained with adhesives employing condensates prepared with a mixture of acetone and diacetone acrylamide, a series of additional condensation reactions (designated A through H in the table below) were carried out in the same manner but using varied molar ratios of acetone, diacetone acrylamide and formaldehyde. Each of the condensates was added to a starch-based adhesive as described above, and the adhesives were then tested for viscosity stability and water resistant bonding properties as described in Examples III and V. The results obtained are given below.

TABLE III

| Condensate | Moles DAA[1] | Moles acetone | Moles formaldehyde | Viscosity in cps. After 4 hrs. | Viscosity in cps. After 24 hrs. | Spindle number | Peel force (lb./linear in.) 1.5 mil film | Peel force (lb./linear in.) 3.0 mil film |
|---|---|---|---|---|---|---|---|---|
| A | 1 | 0 | 2.5 | 2,075 | 4,000 | 4 | 0.20 | 0.11 |
| B | 1 | 1 | 6.0 | 2,275 | 4,300 | 4 | 0.17 | 0.10 |
| C | 1 | 1 | 7.0 | 1,750 | 3,600 | 4 | 0.15 | 0.09 |
| D | 1 | 2 | 9.0 | 2,225 | 10,750 | 5 | 0.17 | 0.11 |
| E | 1 | 2 | 10.5 | 2,750 | 5,400 | 5 | 0.20 | 0.11 |
| F | 1 | 2 | 12.0 | 1,925 | 2,500 | 3 | 0.15 | 0.09 |
| G | 1 | 3 | 12.0 | 2,750 | 70,000 | 7 | 0.15 | 0.08 |
| H | 1 | 3 | 14.0 | 2,775 | 72,000 | 7 | 0.15 | 0.07 |

[1] Diacetone acrylamide.

It is seen from the above data that condensates prepared using two moles of acetone to one mole of diacetone acrylamide can be employed herein without any significant decrease in viscosity stability. Adhesives made with condensates G and H, prepared using three moles of acetone to one mole of diacetone acrylamide, showed a sharp increase in viscosity when measured after 24 hours. Peel force varied only within a relatively narrow range.

Summarizing, it is seen that this invention provides novel corrugating adhesives which are characterized by their stability, with respect to viscosity, prolonged pot life and their ability to form water resistant bonds.

We claim:

1. A corrugating adhesive comprising (a) starch in a concentration of from about 10 to 40% based on the total weight of the adhesive, wherein a minor portion of the starch is gelatinized and the remainder is ungelatinized; (b) an alkali in a concentration of from about 0.3 to 4% based on the total weight of starch; (c) a diacetone acrylamide-formaldehyde condensate in a concentration of from 0.3 to 10% based on the total weight of the starch; and, (d) from about 54 to 89% water based on the total weight of the adhesive.

2. The adhesive of claim 1, wherein the diacetone acrylamide-formaldehyde condensate contains from about 1.5 to 5 moles of formaldehyde per 1 mol of diacetone acrylamide.

3. The adhesive of claim 1, wherein the alkali is sodium hydroxide.

4. The adhesive of claim 1, wherein there is also present borax.

5. The adhesive of claim 1, wherein the diaectone acrylamide-formaldehyde condensate is partially replaced with a condensate of acetone-formaldehyde.

6. The adhesive of claim 5, wherein the acetone-formaldehyde condensate contains from about 2 to 6 moles of formaldehyde per 1 mol of acetone.

7. The adhesive of claim 1, wherein the diacetone acrylamide-formaldehyde condensate is replaced with a diacetone acrylamide-acetone-formaldehyde condensate.

8. The adhesive of claim 1, wherein the gelatinized starch is at least partially replaced with a water dispersible, polyhydroxy-polymeric material selected from the group consisting of sodium carboxymethyl cellulose, polyvinyl alcohol and hydrolyzed polyvinyl acetate.

9. The adhesive of claim 1, wherein said gelatinized starch is a high amylose cornstarch.

10. A corrugating adhesive comprising (a) corn starch in a concentration of from about 18 to 30% based on the total weight of the adhesive, wherein a minor portion of the starch is gelatinized and the remainder is ungelatinized; (b) an alkali in a concentration of about 3% based on the total weight of starch; (c) a diacetone acrylamide-formaldehyde condensate in a concentration of about 3% based on the total weight of starch; and (d) from about 64 to 76% water based on the total weight of the adhesive.

11. The adhesive of claim 10, wherein there is also present borax.

12. The adhesive of claim 10, wherein said gelatinized starch is a high amylose corn starch.

13. The adhesive of claim 10, wherein the alkali is sodium hydroxide.

14. The adhesive of claim 10, wherein the diacetone acrylamide-formaldehyde condensate is replaced with a diacetone acrylamide-actone-formaldehyde condensate.

15. A corrugated paperboard product prepared employing the corrugating adhesive of claim 1.

16. A corrugated paperboard product prepared employing the corrugating adhesive of claim 10.

References Cited

UNITED STATES PATENTS 3,321,422  5/1967  Houff _____ 260—233.3 R
3,518,326  6/1970  Forsberg _____ 260—64
3,551,384  12/1970  Zeh, Jr. _____ 260—63 N THEODORE MORRIS, Primary Examiner U.S. Cl. X.R.

260—17.3 R, 17.4 ST

UNITED STATES PATENT OFFICE
CERTIFICATE OF CORRECTION

Patent No. 3,728,141      Dated April 17, 1973

Inventor(s) Dilip K. Ray-Chaudhauri et al.

It is certified that error appears in the above-identified patent and that said Letters Patent are hereby corrected as shown below:

On the cover sheet insert item --[73] Assignee

National Starch and Chemical Corporation, New York, N.Y., a Corporation of Delaware --.

Signed and sealed this 26th day of March 1974.

(SEAL)
Attest:

EDWARD M. FLETCHER, JR.
Attesting Officer

C. MARSHALL DANN
Commissioner of Patents